A. BOYER.
HOSE COUPLING.
APPLICATION FILED JAN. 16, 1911.
1,021,127.
Patented Mar. 26, 1912.
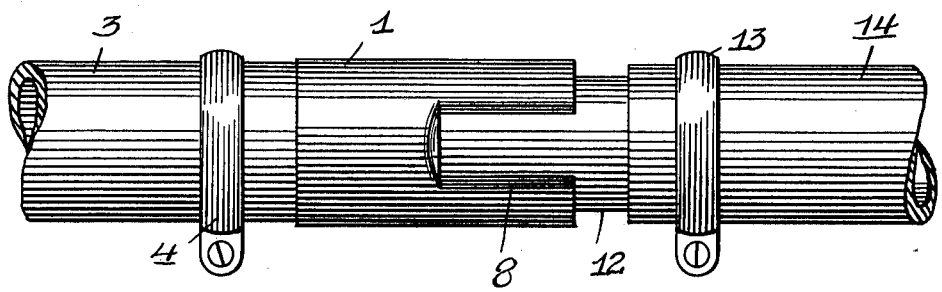
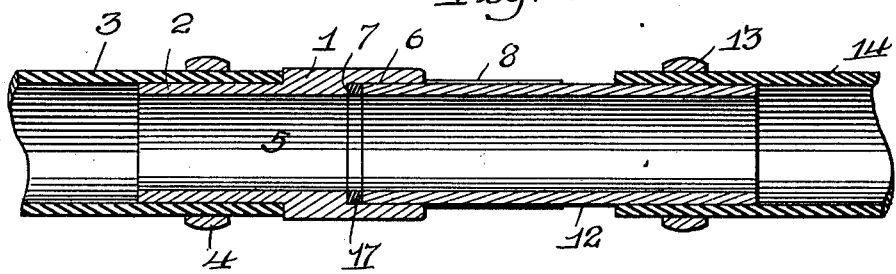
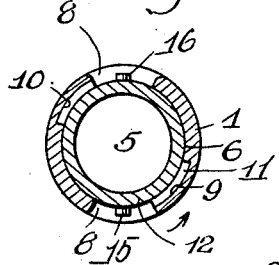
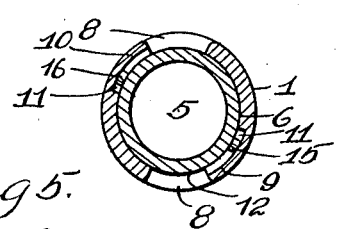
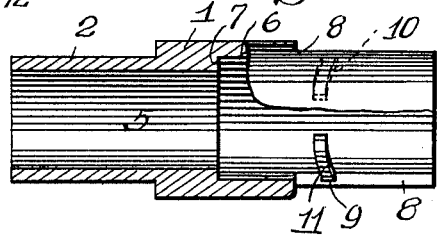
WITNESSES
INVENTOR
A. Boyer.
by Attorneys.

UNITED STATES PATENT OFFICE.

AARON BOYER, OF SWISSVALE, PENNSYLVANIA.

HOSE-COUPLING.

1,021,127.   Specification of Letters Patent.   Patented Mar. 26, 1912.

Application filed January 16, 1911. Serial No. 602,896.

*To all whom it may concern:*

Be it known that I, AARON BOYER, a citizen of the United States of America, residing at Swissvale, in the county of Allegheny and State of Pennsylvania, have invented certain new and useful Improvements in Hose-Couplers, of which the following is a specification, reference being had therein to the accompanying drawing.

This invention relates to hose couplers, and the primary object of the invention is to provide the ends of a section or piece of hose with means in a manner as will be hereinafter set forth, whereby two sections or pieces of hose can be easily and quickly connected together, without the use of screw threads and wrenches for making the connection.

Another object of the invention is to provide a hose coupler that can be advantageously used in connection with fire hose and fire hydrants.

A further object of the invention is to provide a hose coupler that is simple in construction, inexpensive to manufacture and capable of withstanding the rough usage to which fire hose is subjected.

I attain the above object by a mechanical construction that will be hereinafter specifically described and then claimed, and reference will now be had to the drawing, wherein:—

Figure 1 is a side elevation of the hose coupler, Fig. 2 is a longitudinal sectional view of the same, Fig. 3 is a cross sectional view of the hose coupler in an unlocked position, Fig. 4 is a similar view in a locked position, and Fig. 5 is a side elevation of a tubular socket member of the coupler partly broken away and partly in section.

The tubular socket member of the hose coupler comprises a sleeve 1 having the rear end thereof reduced, as at 2 to fit in the end of a section or piece of hose 3, which is connected to the reduced end of the sleeve 1 by a clamp 4 or other fastening means. The bore 5 of the sleeve 1 is of a less diameter than the section of hose 3 and the forward end of the bore 5 is enlarged to provide a socket 6 and an annular shoulder 7. The walls of the socket member at the forward end thereof are cut away upon diametrically opposed sides to provide slots 8, and the inner walls of the socket member are provided intermediate the ends thereof with curved grooves 9 and 10 having the inner ends thereof closed and the outer ends terminating at the slots 8. The curved grooves 9 provide cam surfaces 11, the object of which will presently appear.

The socket member is adapted to receive the forward end of a tubular member 12, and mounted upon the rear end thereof by a clamp 13 or other fastening means is the ends of a section or piece of hose 14. The forward end of the tubular member 12 is provided with two diametrically opposed pins or lugs 15 and 16 and the slots 8 provide clearance for these pins or lugs as the tubular member is pushed into the socket member. After the tubular member 12 has been seated in the socket member, it is rotated a quarter of a revolution to the left, whereby the pin or lug 16 will ride into the groove 10, and the pin or lug 15 into the groove 9, and as said lugs contact with the cam surfaces 11 of said grooves, the tubular member 12 is further drawn into the socket member to provide a non-leakable connection between said members. To insure a non-leakable connection, a rubber gasket 17 is mounted upon the annular shoulder 7 within the socket 6, and as the tubular member 12 is forced into the socket member, the forward end of the tubular member contacts with the gasket 17 and compresses the same sufficiently to establish a non-leakable connection.

The coupler in its entirety is made of brass or a non-corrodible material and of various sizes.

What I claim is:

A hose coupling comprising a tubular member for connection to one end of a hose section and having its inner end formed of two different diameters, that portion of large diameter providing a socket, with the wall thereof for a portion of its length formed with oppositely disposed relatively wide longitudinally extending slots providing a pair of arms, said arms segment-shaped in cross section and each having its inner face formed with a grooved curve of a length less than half the width of its respective arm, the groove of one arm being oppositely disposed with respect to the groove of the other arm and each of the grooves having its outer end terminating at one of the slots, a cylindrical member for connection to one end of the other hose section, said cylindrical member having its forward end extending into said socket and projecting beyond the ends of the slots, said cylindrical member of the same diameter from end to end and having its inner diameter the same as the smaller diameter of the inner end of the tubular member, diametrically opposed pins carried by said cylindrical member and engaging in the grooves of said arms whereby the cylindrical member, when shifted, will be drawn into said socket by the walls of the grooves as the pins enter these latter, and a gasket interposed between one end of the cylindrical member and the inner wall of the socket, and pressed when the cylindrical member is drawn into the socket by the pins.

In testimony whereof I affix my signature in the presence of two witnesses.

AARON BOYER.

Witnesses:
MAX H. SROLOVITZ,
KARL H. BUTLER.

Copies of this patent may be obtained for five cents each, by addressing the "Commissioner of Patents. Washington, D. C."